United States Patent
Wielockx et al.

(10) Patent No.: US 9,210,943 B2
(45) Date of Patent: Dec. 15, 2015

(54) FOOD CASINGS WITH MODIFIED ADHESION AND RELEASE PROPERTIES AND METHODS OF MANUFACTURE

(75) Inventors: Pierre Wielockx, Lommel (BE); Esa Hihnala, Lohja (FI); Roger Hendrikx, Zonhoven (BE)

(73) Assignee: ViskoTeepak Belgium NV, Lommel (BE)

( * ) Notice: Subject to any disclaimer, the term of this patent is extended or adjusted under 35 U.S.C. 154(b) by 82 days.

(21) Appl. No.: 12/872,191

(22) Filed: Aug. 31, 2010

(65) Prior Publication Data

US 2012/0052223 A1 Mar. 1, 2012

(51) Int. Cl.
- *A22C 13/00* (2006.01)
- *B05D 1/34* (2006.01)
- *B05D 3/00* (2006.01)

(52) U.S. Cl.
CPC ....... *A22C 13/0013* (2013.01); *A22C 2013/003* (2013.01); *A22C 2013/0046* (2013.01); *A22C 2013/0053* (2013.01); *A22C 2013/0096* (2013.01); *Y10T 428/1324* (2015.01)

(58) Field of Classification Search
CPC ............. A22C 13/00; A22C 2013/003; A22C 2013/0096; Y10S 206/802; Y10S 426/811; Y10T 428/13; Y10T 428/1324
USPC .......................................... 206/802; 427/209
See application file for complete search history.

(56) References Cited

U.S. PATENT DOCUMENTS

| | | | |
|---|---|---|---|
| 3,670,697 A | | 6/1972 | Kindl et al. |
| 3,896,764 A | | 7/1975 | Kindl et al. |
| 4,169,163 A | * | 9/1979 | Judd et al. ..................... 426/413 |
| 4,221,821 A | | 9/1980 | Hammer et al. |
| 4,390,490 A | | 6/1983 | Martinek et al. |
| 4,543,282 A | * | 9/1985 | Hammer et al. ........... 138/118.1 |
| 5,358,765 A | * | 10/1994 | Markulin ..................... 428/34.8 |
| 5,449,318 A | * | 9/1995 | Halftown et al. ............... 452/50 |
| 5,595,796 A | | 1/1997 | Hammer et al. |
| 6,245,837 B1 | * | 6/2001 | Cassel et al. ..................... 524/35 |
| 6,395,356 B1 | * | 5/2002 | Wielockx et al. ............. 428/34.8 |
| 6,656,547 B2 | * | 12/2003 | Hammer et al. ............. 428/34.8 |
| 2001/0045236 A1 | | 11/2001 | Verschueren et al. |
| 2006/0127538 A1 | * | 6/2006 | Appleby ........................ 426/105 |
| 2006/0263495 A1 | * | 11/2006 | Langton et al. ............... 426/132 |
| 2007/0172558 A1 | | 7/2007 | Hammer et al. |
| 2008/0280021 A1 | * | 11/2008 | Hammer et al. ............. 426/652 |
| 2010/0003376 A1 | * | 1/2010 | Blumenberg et al. ......... 426/105 |

FOREIGN PATENT DOCUMENTS

| | | |
|---|---|---|
| DE | 103 60 610 A1 | 7/2005 |
| DE | 102004046355 A1 * | 4/2006 |
| DE | 10 2005 032241 A1 | 11/2007 |
| GB | 723323 A * | 9/1955 |
| WO | WO 00/76322 | 12/2000 |

OTHER PUBLICATIONS

Michael Ash; Irene Ash, "Handbook of Fillers, Extender, and Diliuents" 2nd edition, 2007, Synapse Information Resource Inc, p. 607.*
Jakubke, Hans-Dieter; Jeschkeit, Hans; Editors "Concise Encyclopedia Chemsitry", 1994, de Gruyter Publishing, pp. 865-866.*
Bailey, Frederick E., and J. V. Koleske. Alkylene Oxides and Their Polymers. New York: Dekker, 1991. pp. 205-206.*
Authorized officer Angel Rojo Galindo, International Search Report in PCT/FI12011/050751, mailed Sep. 12, 2011, 4 pages.

* cited by examiner

*Primary Examiner* — Gwendolyn Blackwell
*Assistant Examiner* — Lee Sanderson
(74) *Attorney, Agent, or Firm* — Fish & Richardson P.C.

(57) ABSTRACT

The invention relates to a multilayer fibrous reinforced food casing comprising a fibrous reinforced layer located between an inside layer and an outer layer; the inside layer comprising an adhesion promoter comprising one or more of protein coagulants, proteins, glyoxals, glutaraldehyde, caseins, gelatines, wet strengths resins and any mixtures thereof; and the outer layer comprising a peeling agent comprising one or more of polyalkylene glycols and any mixtures thereof or the inside layer comprising a peeling agent comprising one or more of polyalkylene glycols and any mixtures thereof; or the outer layer and the inside layer comprising a peeling agent comprising one or more of polyalkylene glycols and any mixtures thereof.

8 Claims, No Drawings

FOOD CASINGS WITH MODIFIED ADHESION AND RELEASE PROPERTIES AND METHODS OF MANUFACTURE

FIELD

This document relates to food casings and more particularly to fibrous reinforced food casings having, incorporated in their structure, agents improving the properties thereof. This document relates also to a method for production of said food casings.

BACKGROUND

Food casings based on cellulose, and particularly fibrous food casings, have been used for decades for the production of raw sausages, dry sausages and semi-dry sausages.

In the manufacture of processed sausage products, a meat emulsion is prepared from comminuted meat together with fillers, seasonings, spices, etc. A tubular food casing, such as one containing non-edible cellulose, is loaded onto the stuffing horn of a filling machine and stuffed with the meat emulsion. In the case of small sausage products, the filled casings are twisted, tied or clipped into suitable links at predetermined intervals and further processed. For larger sausage products like bologna, salami, and the like, the meat emulsion is introduced into larger, heavier walled casings or casings having fibrous reinforcements, and formed into chubs or lengthy individual sausage sticks or logs for further processing, e.g. cooking and smoking.

Dry or semi-dry sausages, sometimes referred to as cervelats or summer sausages, are larger meat products, which include such representative examples as air dried pepperoni, soft salami, hard salami and dry salami, and the like. As the name suggests, this type of sausage has reduced moisture content, and its preparation usually includes drying as one step in its manufacture. Dry sausage may also be smoked. Cooking can also be performed in some instances during the smoking step.

Some of the typical features relating to these sausages and their production are presented in the following. First of all, there are significant variations in the meat emulsion compositions, which affect the processing and the final product. Further, filling or stuffing of the meat emulsion into casings ranges from close diameter control to manual highly varying diameter stuffing, and subsequent processing or curing of sausages ranges from fermented mild early cook to initial higher temperature cured raw sausage. There are also variations in the ripening and respective drying cycles to reach a final protein to fat ratio. Ripening and drying is characterized by a typical weight loss ranging from approximately 10 to 30%, which is associated with a volume proportional to the weight loss or moisture loss, mainly radial shrinkage.

Due to the above reasons several challenges and limitations are faced during the production of dry and semi-dry sausages. It is essential that the drying and ripening rate is such that no case hardening and mould formation takes place, both being temperature and relative humidity dependent. During the above mentioned production cycles the casing needs to adhere sufficiently to the sausage or meat mass to avoid grease or oil spot formation between the sausage and casing, and to prevent casing releasing. Further, the adhesion of the meat to the casing needs to be such that the casing can be peeled off by different peeling procedures, which may range from manual peeling to fast speed automatic peeling. Finally, the productivity should also be maintained at an acceptable level for economic reasons.

Several methods and chemical agents have been proposed for improving or creating adhesion of a cellulose casing to proteins or sausages and to ensure release of the casing. However, these approaches have several limitations, for example the variation due to internal bubble coating technology, the fluctuation due to the variation in the amount of fibre on inside of the casing depending on the degree of viscose penetration, and too high adhesion particularly for sausage types requiring the combination of higher weight loss and fast or automatic peeling.

The internal bubble technique has several short-comings. The bubble method is dependent on many process variables making it difficult to achieve product uniformity and quality control. This is due to such variables as rate of casing travel; initial concentration of the coating solution; rate of exhaustion and depletion of resin from the coating solution; amount of pressure applied by the squeeze rolls, etc. Such factors determine the amount of resin with which the inner wall of the casing will be coated and the frequency with which the coating composition will require replenishing. Liquid transfer from tanks can also dilute the bubble in standard operations. Because the resin in solution between the rolls is constantly being depleted from the casing interior the coating being applied lacks uniformity and produces a "two side effect", i.e., different meat cling over the circumference of the casing. Due to risks of roping or folding the coating via the bubble method can also result in uneven distribution and areas with insufficient active material.

The use of internal impregnation with combinations of chemicals including both an adhesion promoter chemical and a release chemical has been suggested in the art. The downsides and limitations of these approaches are for example the incompatibility of the different chemical families (hydrophobic versus hydrophilic) requiring additional components to act as emulsifiers, and difficulties in finding an acceptable balance between the chemicals and desired characteristics. The proposed solutions are typically only limited for a unique combination of sausage emulsion and processing and still have the variation associated with a typical internal bubble impregnation process.

In later developed double viscose coating technique adhesion promoters, such as polyamine-polyamide-epichlorohydrin resins, optionally in combination with proteins were incorporated into the internal cellulose layer of the double coated fibrous casings, whereby the elimination of the internal bubble impregnation variation was avoided, resulting in a more consistent internal cling ie. meat adhesion property.

More efficient and faster processing of food products, particularly pork and pepperoni sausages requires the use of higher production temperatures, which results in significant greasing out.

In order to meet the various challenges relating to food casings and their manufacture different approaches have been suggested, which may be optimum for a particular type of sausages but to this point each of these have shown limitations in both "general purpose use" and "sausage productivity enhancement". None of the above described solutions are able to combat this problem in an optimal way and varying of the parameters typically leads to new problems.

In particular, there is a need for more efficient methods of preparing fibrous casings with desired balance between low cling (adhesion) properties where such properties can be replicated with better quality control and uniformity between production runs through less manual handling (bubble changes), automatic dosing of the adhering agent, and more consistent amounts of adhering agent being applied. There is further a need for being able to fine-tune adherence characteristics for various food casing products, which are similar under both wet and dry conditions, and also to decrease the amount of adhesion promoters and release compounds used in casings.

In the light of the state of the art it can be seen that there is a need for food casings and particularly for modified fibrous type food casings for dry and semi-dry sausage products, which offer a better balance between adherence/cling and release properties, meets the above requirements and simultaneously provides an economic solution with respect to sausage productivity.

SUMMARY OF THE INVENTION

One or more of the embodiments disclosed herein meet one or more of the following objects of the invention. It is an object of the invention to provide for cellulose food casings, and particularly fibrous reinforced cellulose food casings having improved adhesion, release and processability properties with the foodstuff packaged therein.

It is a further object of the invention to provide for tubular fibrous reinforced cellulose food casings having improved adhesion, release and processability properties, and which casings are useful in packaging and manufacture of dry and semi-dry sausages.

It is yet a further object to provide for tubular fibrous reinforced cellulose food casings for facilitating the production of a wide range of dry and semi-dry sausage product recipes requiring more balance between adherence/cling and release properties with the packaged foodstuff.

It is yet a further object of the invention to provide a method for the manufacture of cellulose food casings, and particularly fibrous reinforced cellulose food casings, including tubular food casings, having improved adhesion and release properties with the foodstuff packaged therein, with a decreased amount of adhesion promoters.

Characteristic features of the invention are provided in the appended claims.

The present invention provides for fibrous reinforced cellulose food casings, including tubular food casings, comprising incorporated in their structure:

a) a peeling agent selected from polyalkylene glycols and any mixtures thereof; and b) an inside film adhesion promoter selected from protein coagulants, proteins, glyoxals, glutaraldehyde, caseins, gelatines, wet strengths resins and any mixtures thereof.

Said food casing is a multilayer casing comprising an outside layer, an inside layer and fibrous reinforcement between the outside layer and the inside layer.

The outside layer and the inside layer comprise viscose regenerated cellulose, typically cellulose hydrate.

The peeling agent is incorporated in the outside layer or in the inside layer or in both layers.

The inside film adhesion promoter is incorporated in the inside layer.

The present invention provides also a method for the manufacture of said fibrous reinforced cellulose food casings, including tubular food casings, said method comprising the steps, where a) a peeling agent selected from polyalkylene glycols and any mixtures thereof is injected in an outside viscose stream or an inside viscose stream or both, b) an inside film adhesion promoter selected from protein coagulants, proteins, glyoxals, glutaraldehyde, caseins, gelatines, wet strengths resins and any mixtures thereof is injected in the inside viscose stream, c) a fibrous web, preferably a tubular fibrous web is impregnated with viscose by applying to the inside of the fibrous web the inside viscose stream; and applying to the outside of the fibrous web the outside viscose stream; and d) the method is continued with conventional coagulation, regeneration, washing and drying steps.

This disclosure describes cellulose food casings, particularly fibrous reinforced cellulose food casings, including multilayer tubular food casings, which are suitable for packaging and manufacture of wide range of dry and semi-dry sausage products, such as pepperoni, hard and semi-soft salamis, and the like.

DETAILED DESCRIPTION OF THE INVENTION

It was surprisingly found that food casings, particularly tubular fibrous reinforced cellulose food casings comprising a) a peeling agent selected from polyalkylene glycols and any mixtures thereof; and b) an inside film adhesion promoter, have desired meat adherence properties and release properties without greasing out and in addition, swelling and retaining moisture is at a higher level, which is preferable for the processing of dry and semi-dry sausages. Certain of the food casings disclosed herein are multilayer fibrous cellulose casings comprising at least an outer layer, an inside layer and fibrous reinforcement between the outer layer and the inside layer.

"Inside film adhesion" refers here to adhesion of meat mass or sausage to the inside of the packaging film or casing, which is in direct contact with the meat mass or sausage. More accurately, adhesion refers to the interaction and bonding between the cellulose surface of the film and meat surface.

According to one embodiment of the invention, the cellulose based food casing is a double viscose layer tubular fibrous reinforced cellulose casing (inside/outside viscose coatings on fibrous reinforcement), also referred to as double layer viscose casing (DVC). Said casings are suitable for packaging and manufacture of for a wide range of dry and semi-dry sausage products. Some examples of such sausage products are semi-dry Russian Doro, pepperoni sausages for pizza toppings and US West coast mould ripened type salami sausages.

Cellulose food casing, as used herein, means essentially any food casing containing a significant portion of cellulose, regenerated from viscose. While the preferred viscose is xanthate type viscose, it is to be understood that any other technologies to dissolve and extrude cellulose having similar characteristics are included, e.g. aminomethanate viscose (also known as carbamate or aminomethanate viscose and cupraammonium type viscose) as well as any solutions based on non-derivatized cellulose, such as cellulose-tertiary amine amine oxide (NMMO) solutions and solutions based on ionic liquids.

Cellulose may be precipitated from an aqueous solution of viscose, e. g. xanthate. Precipitated, as used herein means either precipitation of nonderivatized cellulose from a solution, e. g. cellulose in a cupraammonium solution or an amine oxide solution, or by coagulation of derivatized cellulose, e. g. xanthate cellulose or cellulose aminomethanate; followed by regeneration to remove derivatizing groups. The precipitated or coagulated cellulose casings are typically further processed by conventional washing and drying steps.

Said food casings may be reinforced with fibre. Such fibre reinforcement is typically a paper made from a strong natural cellulose fibre. An example of such fibre is hemp but it may also be a regenerated cellulose fibre in the form of rayon or may be other natural or synthetic fibre. It is to be understood that woven sheets or webs from such fibres may also be used. All of such fibre reinforced food casing products may be referred to herein as "fibrous" casing.

The casings of the invention are particularly fibrous casings. Tubular fibrous casing may be formed by shaping a fibre sheet or web into the form of a tube having overlapping edges followed by impregnating the sheet or web with viscose. When the viscose is regenerated by known methods, the resulting regenerated cellulose adheres and seals the edges to form a seam and the fibres add significant strength to the regenerated cellulose product. Viscose may be applied to both the inside and outside surfaces of the tube. Some of the viscose may become impregnated within the fibre layer. Such methods are known from the art and described in U.S. Pat. Nos. 3,670,697; 3,896,764 and 4,390,490; the entire content thereof of each patent being incorporated herein by reference.

As used herein, unless otherwise noted, the weight percentages of the components (peeling agent, inside film adhesion promoter, optional paraffin) of the casing are based on the total dry weight of the viscose regenerated cellulose contained in the casing. The cellulose (viscose regenerated cellulose) particularly refers to all cellulose coming from the viscose applied to the fibre reinforcement, inside and outside. The dry weight of the casing refers to the weight after plastizizer (glycerine) is removed by washing out and the casing is dried (bone dry) and all water removed. The basis weight of the fibre reinforcement is deducted from the dry weight of the casing to obtain the total dry weight of the viscose regenerated cellulose contained in the casing. In the case paper made of regenerated cellulose is used as fibre reinforcement, the content of said cellulose is also included in the dry weight of the viscose regenerated cellulose.

The peeling agent may be selected from polyalkylene glycols and any mixtures thereof. The polyalkylene glycol may be selected from polyethylene glycols. Polyethylene glycols are typically non-volatile linear homopolymers of ethylene oxide. The molar mass (molecular weight) of polyethylene glycol may range between about 15,000 and about 60,000 g/mol, preferably the molar mass ranges between about 20,000 and about 50,000 g/mol, particularly preferably between about 25,000 and about 40,000.

The amount of the peeling agent in the casing may be between about 0.1 and about 30% by weight, preferably between about 0.2 and about 20% by weight, and particularly preferably between about 0.25 and about 15% by weight. The peeling agent may be incorporated in the outside layer and injected in the outside viscose stream.

Optionally, paraffin may be added as an additional peeling agent to the casing. Paraffin may be incorporated in the outside layer or in the inside layer or in both layers by injecting it in the outside viscose stream or the inside viscose stream, or both.

Paraffins may be paraffin waxes in the form of mixed hydrocarbon waxes containing a high proportion of C16-C40 alkanes, macrocyrstalline, microcrystalline paraffin wax produced by a solvent dewaxing process, or slack wax produced by a sweating process. The wax is usually a saturated hydrocarbon wax but it may be a partially or completely halogenated C16-C42 hydrocarbon, e. g. with fluorine. The paraffin waxes are emulsified with the aid of cationic, anionic, or nonionic surfactants to form stable emulsions. Preferably, anionic or nonionic surfactant is used in the emulsification. The wax emulsions may contain from about 10 to about 40 weight percent wax.

Sufficient wax emulsion may be used to obtain a paraffin content between about 0.1 and about 10% by weight, preferably between about 0.1 and about 7% by weight.

The inside film adhesion promoter may be selected from protein coagulants, proteins, glyoxals, glutaraldehyde, caseins, gelatines, wet strengths resins and any mixtures thereof. Suitable examples of protein coagulants are quaternary ammonium salts, examples of proteins are blood albumins, and examples of wet strengths resins are polyamine-polyamide-epichlorohydrin resins, protein-, urea- and melamine formaldehyde resins. Polyamine-polyamide-epichlorohydrin resins may be used.

The amount of the inside film adhesion promoter may be between about 0.001 and about 0.5% by weight, preferably between about 0.005 and about 0.25% by weight, and particularly preferably between about 0.005 and about 0.15% by weight.

The casing may comprise a total load of cellulose between about 20 to 45 $g/m^2$. When paper made from regenerated cellulose is used as fibre reinforcement the casing may comprise a total load of cellulose between about 30 to 75 $g/m^2$.

The method for the manufacture of fibrous reinforced cellulose food casings may comprise the following steps, where a) a peeling agent comprising one or more polyalkylene glycols and any mixtures thereof is injected in an inside viscose stream or outside viscose stream or both;

b) an inside film adhesion promoter comprising one or more protein coagulants, proteins, glyoxals, gluteraldehyde, caseins, gelatines, wet strengths resins and any mixtures thereof is injected in an inside viscose stream;

c) a fibrous web, preferably a tubular fibrous web is impregnated with viscose by applying to the inside of the fibrous web the inside viscose stream; and applying to the outside of the fibrous web the outside viscose stream; and d) the method is continued with conventional coagulation, regeneration, washing and drying steps.

Optionally paraffin is additionally injected in step a) in viscose, in the inside viscose stream or outside viscose stream or both.

The peeling agents and inside film adhesion promoters are used in amounts to achive the desired final contents of the components in the casing (final product), as calculated based on the total dry weight of viscose regenerated cellulose in the casing, as defined earlier.

The peeling agent may be injected in viscose (in the inside viscose stream or outside viscose stream or both) in amounts to achieve the content between about 0.1 and about 30% by weight, preferably between about 0.2 and about 20% by weight, and particularly preferably between about 0.25 and about 15% by weight in the casing (final product).

The inside film adhesion promoter may be injected in viscose in amounts to achieve the content between about 0.001 and about 0.5% by weight, preferably between about 0.005 and about 0.25% by weight, and particularly preferably between about 0.005 and about 0.15% by weight in the casing (final product).

Paraffin may be injected in viscose in amounts to achieve the content between about 0.1 and about 10% by weight, preferably between about 0.1 and about 7% by weight in the casing (final product).

The viscose streams in step c) may be injected through different orifices, suitably inside and outside orifice.

Embodiments of the food casings disclosed herein provide several advantages over the state of the art. The casing requires significantly lower peel forces than for example single layer viscose casings (SVC) typically used in the manufacture of pepperoni sausages and it has much less risk for peeling errors in industrial high speed peeling. This is also demonstrated in example 1, where peel forces of DVC and SVC casings are compared. In the case that low fat protein sources are used, for example in the manufacture of poultry pepperoni sausages or pork/poultry pepperoni sausages, SVC casings require an additional special easy peel bubble treatment for acceptable peeling.

Embodiments of the food casings disclosed herein give the benefit that injection technology can be used both in the inside and outside layer of the casing to obtain a casing with tailor-made internal adhesion properties while still having good peeling and release properties during industrial high speed peeling. The DVC casing may provide a benefit over SVC in that the inside surface roughness is not a result of viscose flow properties and paper porosity properties because of the constant and uniform inside viscose and resulting regenerated cellulose layer.

The food casings disclosed herein are suitable for industrial pepperoni production because no oil or grease spots on the pepperoni surface are formed and no oil or grease layers (even very thin) are formed between the sausage and casing. Oil or grease layers in sausages cause slower diffusion, thereby slowing down drying and aging of the products and subsequently reducing productivity and increasing work-in process.

Even when a casing has sufficient adhesion to meat it needs to peel without interruptions in continuous high speed, which provides for the industrial pepperoni industrial pepperoni processor a basis to increase the productivity by using higher processing temperatures and accelerated drying conditions, which in turn causes more risk for greasing and oil spot formation.

Further, the above parameters are influenced by the type of meat used in respective industrial pepperoni processes. More fat containing protein sources, such as pork give easier grease and oil formation than lower fat protein sources, such as poultry. The former will also enable easier peeling than the latter.

Thus, there is highest risk for greasing with pork/beef high temperature pepperoni products while with turkey/chicken pepperonis the risk is lower for greasing but highest risk for poor peeling.

The above shows that due to different types of pepperoni processes it is important to have the freedom in casing manufacturing to make the optimum casing for each of the unique conditions.

One or more of the embodiments disclosed herein may contain the following advantages.

The fibrous reinforced cellulose food casings disclosed herein may provide a controllable level of meat cling together with desired release properties and sausage processability. During sausage manufacture, even at high weight loss or high temperature processing said casings do not release. There are no problems when shirring of the casing.

The food casings disclosed herein are suitable for the production of many types of dry and semi-dry sausages and may be tolerant for different and extreme conditions of ripening. Said sausages may be manufactured for example from beef, pork, chicken, turkey and any other components used in these products.

Embodiments of the food casings disclosed herein tolerate many variations with respect to sausage ripening conditions and drying conditions. Faster drying is achieved without case hardening (drying out of outside layer), yet maintaining optimal casing moisture balance. Excessive greasing-out (leaking of fat) can be avoided and objectionable quantities of air pockets are not formed during stuffing. Said casings provide improved ripening and drying control of the sausage.

Using the method described herein, polyethylene glycol having higher molecular size is not washed-out in additional processing steps and it is still present in sufficient levels to assist with peeling and the moisture retention properties of casings are maintained.

Because of the very good peelability, after ripening and drying, of the food casing disclosed herein, problems with high speed peeling can be avoided.

Further, no inside bubble peeling treatment should be necessary, which is currently required for many chicken and turkey pepperoni sausage types. Wrinkle-free products with constantly desired shrinkage and consistent inside surface may be obtained.

Using embodiments of the food casings disclosed herein, more aggressive drying and curing conditions and higher temperatures may be used in the manufacture of the food products, without unacceptable greasing out, thus providing faster and more efficient manufacture.

Surprisingly, the amount of the inside film adhesion promoter i.e. meat cling agent can be reduced to a very low level and still obtain a desired effect.

EXAMPLES

The following examples are provided to illustrate certain aspects of the invention, however, they are not meant to limit the scope of the invention. The testing was carried out in a small-scale testing laboratory.

Polyethylene glycol (=PEG, Polyglykol 35000 S, Clariant International Ltd., Pratteln, Switzerland) was used in the examples as the peeling agent and it had a molecular weight of about 35,000 g/mol.

Polyamine-polyamide-epichlorohydrin (EKA VS XO LV, EKA Chemicals Ab, Bohus, Sweden) was used in the examples as the inside film adhesion promoter.

In the tests, the main focus was on pork/beef in high temperature applications. A test was also run using typical Russian semi-dry sausage cycle, because it has different cycle times and also contains a smoking cycle, which typically will increase peel forces, making peeling more difficult.

Example 1 (Reference)

Test Matrix 1

Pork/Beef High Temperature Pepperoni

Pork/beef high temperature pepperoni sausages were manufactured in a conventional manner with heating after fermentation at fully cooking temperature (no smoke cycle) in SVC casings and traditional DVC casing as a reference. With pork/beef high temperature pepperoni, some in the industry believe that SVC casings give the best adhesion to prevent grease and oil spots. However, SVC casing is typically more sensitive for factors causing inconsistencies in peeling, such as viscose paper penetration due to inconsistency in paper. Traditional DVC casings have typically not been accepted for pork/beef high temperature pepperoni because of grease and oil spots. Traditional DVC casings work well with turkey/chicken low temperature pepperoni (heating after fermentation at <50° C.) from both a grease and oil formation perspective as well as from the perspective of peeling speed. With turkey/chicken low temperature pepperoni SVC casings require a special additional internal easy peel treatment to peel well.

Reference casings: The reference casing SVC (VT) was commercial ViskoTeepak 1L casing. SVC (C) was another commercial SVC casing. Traditional DVC casing was Visko-Teepak size 1 DVC casing.

Test casing: Test casing DVC (test casing 1) was manufactured using a double layer viscose technique where a casing is manufactured having a fibrous layer coated on each side with viscose. DVC casings was made by injecting in the viscose PEG (5% by weight, based on dry regenerated viscose cellulose of the casing) to obtain a outside viscose stream, a tubular fibrous web is then impregnated with viscose by applying to the inside of the tubular fibrous web an inside viscose stream; and applying to the outside of the tubular fibrous web the outside viscose stream; and the method is continued with coagulation, regeneration, washing and drying steps.

Results are provided in following table 1.
Table 1.

| Sample | SVC VT (ref) | SVC C (ref) | DVC (ref) | DVC (test casing. 1) |
|---|---|---|---|---|
| Inside film adhesion promoter | No | No | No | No |
| Outside peeling agent | No | No | No | 5% |
| Inside peeling agent | No | No | No | No |
| Grease/oil | No | No | Yes | Yes |
| Peel force * | 525N | 400N | 240N | <100N |

* Peelforce: force to peel a 2 cm wide strip away from sausage

Conclusions: Peel forces of SVC casings are so high that when adding upward variability of normal production one can easily run into poorer high speed peeling performance. Grease out was noticed with the DVC (ref.) casing and with the DVC (test casing 1) containing PEG injected in the outside layer.

It is desirable that peel forces are as low as possible but simultaneously there should be no greasing out. Typically peel forces of below 100 indicate initial grease formation between the sausage and casing. Acceptable level of grease/oil is determined by evaluating whether the casing cannot start to release or show grease/oil spots between the casing and the sausage.

Example 2

Test Matrix 2

Pork/Beef High Temperature Pepperoni

Pork/Beef pepperoni sausages were manufactured in a conventional manner with heating after fermentation at fully cooking temperature (no smoke cycle) in a traditional DVC casing as reference, made without a inside film adhesion promoter and peeling agent and in test DVC casings with varying the injected inside film adhesion promoter levels and outside PEG injection levels.

Test casings: Test casings were manufactured using a double layer viscose technique where a casing is manufactured having a fibrous layer coated on each side with viscose. DVC casings were made by injecting in the viscose PEG (2.5 or 5% by weight, based on dry regenerated viscose cellulose of the casing) to obtain a outside viscose stream and polyamine-polyamide-epichlorohydrin (0 or 0.1% by weight based on dry regenerated viscose cellulose of the casing) to obtain a inside viscose stream, a tubular fibrous web is then impregnated with viscose by applying to the inside of the tubular fibrous web the inside viscose stream; and applying to the outside of the tubular fibrous web the outside viscose stream; and the method is continued with coagulation, regeneration, washing and drying steps.

The test casings comprised a outer layer containing 24 g/m$^2$ of regenerated cellulose, an inner layer containing 8 g/m$^2$ of regenerated cellulose and a paper of 19 g/m$^2$ basis weight as fibrous reinforcement.

Results are presented in Table 2.

TABLE 2

| Sample | DVC (ref) | DVC (test casing. 1) | DVC (test casing. 2) |
|---|---|---|---|
| Inside film adhesion promoter | No | No | 0.1% |
| Outside PEG | No | 5% | 2.5% |
| Inside PEG | No | No | No |
| Grease/oil | Yes | Yes | No |
| Peel force | <100N | <100N | 140N |

Conclusions: Acceptable low peel forces are achieved when using reduced inside film adhesion promoter injection in combination with PEG.

Example 3

Test Matrix 3

Pork/Beef Russian Semi-Dry Sausage with Smoke Cycle

Pork/Russian semi-dry sausage with smoke cycle were manufactured at a temperature of 65° C. in test DVC casings with varying injected inside film adhesion promoter levels and outside PEG injection levels with different cycle times. Peel forces were measured after 3 days of drying.

Test casings: Test casings were manufactured using a double layer viscose technique as follows. DVC casings were made by injecting in the viscose PEG (2.5% by weight weight based on dry regenerated viscose cellulose of the casing) to obtain an outside viscose stream and polyamine-polyamide-epichlorohydrin (0.05 to 0.1% by weight based on dry regenerated viscose cellulose of the casing) to obtain an inside viscose stream. A tubular fibrous web is impregnated with viscose by applying to the inside of the tubular fibrous web the inside viscose stream; and applying to the outside of the tubular fibrous web the outside viscose stream; and the method is continued with coagulation, regeneration, washing and drying steps.

Results are presented in Table 3.

TABLE 3

| Sample | DVC (test casing 1) | DVC (test casing 2) | DVC (test casing 3) |
|---|---|---|---|
| Inside film adhesion promoter | No | 0.1% | 0.05% |
| Outside PEG | 5% | 2.5% | 2.5% |
| Inside PEG | No | No | No |
| Grease/oil | Yes | No | No |
| Peel force | 160N | 170N | 160N |

From these experiments it was surprisingly learned that the test casings 2 and 3 provide a varying degree of internal meat adhesion which prevents greasing out although a PEG is present which by itself typically causes early release and greasing out. Casings do not release even at high weight loss and high temperature pepperoni processes.

After ripening and drying of the sausage products to high weight losses (about 10-30 wt %) the casings can be peeled off easily, for example using a high speed peeling processes.

After being soaked prior to stuffing, the casings are characterized by an increased ability to swell and retain moisture; gel swell values up to 20% by weight and even higher can be reached. Further, the moisture pick-up is faster when relative humidity is increased. These casings are more forgiving for different and extreme conditions of ripening; the casings retain more moisture under different conditions, thereby preventing case hardening.

The invention claimed is:

1. A multilayer tubular fibrous reinforced food casing comprising:
    a fibrous reinforced layer located between an inside layer and an outer layer of a food casing; the inside layer comprising viscose regenerated cellulose and an adhesion promoter comprising one or more of protein coagulants, proteins, glyoxals, glutaraldehyde, caseins, gelatines, wet strengths resins and any mixtures thereof; and
    the outer layer is formed of a composition comprising viscose and a peeling agent;
    wherein the peeling agent is polyethylene glycol, which is a homopolymer of ethylene oxide and has molar mass between 25,000 and 40,000 g/mol, and the amount of the peeling agent is between about 0.1 and about 30% by weight based on the total dry weight of the viscose regenerated cellulose contained in the casing.

2. The fibrous reinforced food casing according to claim 1, wherein the fibrous reinforced food casing is a tubular fibrous reinforced food casing based on cellulose.

3. The fibrous reinforced food casing according to claim 1, wherein the adhesion promoter is a wet strength resin comprising a polyamine-polyamide-epichlorohydrin resin.

4. The fibrous reinforced food casing according to claim 1, wherein the amount of the adhesion promoter ranges between about 0.001 and about 0.5% by weight based on the total dry weight of viscose regenerated cellulose contained in the casing.

5. The fibrous reinforced food casing according to claim 1, wherein the inside layer comprises paraffin, or the outside layer comprises paraffin or both layers comprise paraffin.

6. The fibrous reinforced food casing according to claim 1, wherein the amount of the adhesion promoter ranges between about 0.005 and about 0.25% by weight based on the total dry weight of viscose regenerated cellulose contained in the casing.

7. The fibrous reinforced food casing according to claim 1, wherein the amount of the peeling agent is between about 0.2 and about 20% by weight based on the total dry weight of viscose regenerated cellulose contained in the casing.

8. The fibrous reinforced food casing according to claim 5, wherein the amount of the paraffin is between about 0.1 and about 10% by weight based on the total dry weight of viscose regenerated cellulose contained in the casing.

\* \* \* \* \*